United States Patent
Kim et al.

(10) Patent No.: US 9,059,472 B2
(45) Date of Patent: Jun. 16, 2015

(54) WINDER FOR ELECTRODE ASSEMBLY OF RECHARGEABLE BATTERY

(71) Applicant: Samsung SDI Co., Ltd., Yongin-si, Gyeonggi-do (KR)

(72) Inventors: Hwan Kim, Yongin-si (KR); Yi-Hyun Chang, Yongin-si (KR); Kyung-Do Park, Yongin-si (KR); Jin-Ho So, Yongin-si (KR); Soon-Hak Hwang, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 166 days.

(21) Appl. No.: 13/837,660

(22) Filed: Mar. 15, 2013

(65) Prior Publication Data
US 2014/0117141 A1    May 1, 2014

(30) Foreign Application Priority Data
Nov. 1, 2012    (KR) .................. 10-2012-0123135

(51) Int. Cl.
*B65H 39/16* (2006.01)
*H01M 10/04* (2006.01)
*B65H 18/00* (2006.01)

(52) U.S. Cl.
CPC .......... *H01M 10/0409* (2013.01); *B65H 18/00* (2013.01)

(58) Field of Classification Search
USPC ........ 242/431, 437, 444, 444.1, 444.3, 444.4, 242/444.5, 615.21, 615.1, 615.11, 615.12, 242/548, 548.4
See application file for complete search history.

(56) References Cited

U.S. PATENT DOCUMENTS

| | | | |
|---|---|---|---|
| 5,700,299 A | * | 12/1997 | Clark ........................ 29/623.1 |
| 5,718,395 A | * | 2/1998 | Nakanose et al. ......... 242/444.1 |
| 6,692,542 B1 | | 2/2004 | Kashiyama et al. |
| 7,578,898 B2 | | 8/2009 | Le Gal |
| 2004/0107564 A1 | | 6/2004 | Kurimoto et al. |
| 2011/0289766 A1 | | 12/2011 | Kim et al. |
| 2012/0043408 A1 | | 2/2012 | Oh et al. |
| 2012/0084979 A1 | * | 4/2012 | Viavattine et al. ............. 29/874 |

FOREIGN PATENT DOCUMENTS

| | | |
|---|---|---|
| JP | 2003-151538 | 5/2003 |
| JP | 2010-180062 | 8/2010 |

* cited by examiner

*Primary Examiner* — Emmanuel M Marcelo
(74) *Attorney, Agent, or Firm* — Robert E. Bushnell, Esq.

(57) ABSTRACT

A winder for an electrode assembly of a rechargeable battery for improving space usage is disclosed. The winder includes a plurality of spools supplying a negative electrode member, a positive electrode member, a first separator member, and a second separator member, a mandrel stacking and spirally winding the first separator member, the negative electrode member, the second separator member, and the positive electrode member supplied by the spool, a first frame accommodating a predetermined number of spools from among the plurality of spools and the mandrel, a second frame connected to the first frame and accommodating other spools from among the plurality of spools, a reorienter installed between the first frame and the second frame and reorienting a progressing direction of one of the members, and a position controller controlling a position of the member that passes through the reorienter and progresses towards the mandrel.

9 Claims, 6 Drawing Sheets

WINDER FOR ELECTRODE ASSEMBLY OF RECHARGEABLE BATTERY

CLAIM OF PRIORITY

This application makes reference to, incorporates the same herein, and claims all benefits accruing under 35 U.S.C. §119 from an application earlier filed in the Korean Intellectual Property Office on 1 Nov. 2012 and duly assigned Ser. No. 10-2012-0123135.

BACKGROUND OF THE INVENTION

1. Field of the Invention

The described technology relates generally to a winder for winding an electrode assembly of a rechargeable battery, and more particularly, to a winder having improved space usage for winding an electrode assembly of a rechargeable battery.

2. Description of the Related Art

As technological developments and demands on mobile devices have increased, demands on rechargeable batteries as an energy source have also increased. A rechargeable battery, differing from a primary battery, can be repeatedly charged and discharged. A nickel-hydrogen battery, a lithium battery, and a lithium ion battery are examples of a commonly used rechargeable battery.

The rechargeable battery includes an electrode assembly formed by stacking a positive electrode and a negative electrode with a separator therebetween and spirally winding them into a jellyroll shape, a case for accommodating the electrode assembly together with an electrolyte solution, and a cap assembly for sealing an opening of the case.

A winder is used to manufacture the electrode assembly. The winder includes a negative electrode member spool for supplying a negative electrode member, a positive electrode member spool for providing a positive electrode member, two separator spools for supplying two separator members, and a mandrel for spirally winding the members supplied by the spools.

The above information disclosed in this Background section is only for enhancement of understanding of the background of the described technology and therefore it may contain information that does not form the prior art that is already known in this country to a person of ordinary skill in the art.

SUMMARY OF THE INVENTION

Embodiments of the present invention provide a winder for an electrode assembly of a rechargeable battery for improving space use efficiency and reducing space required by the winder.

Embodiments of the present invention also provide a winder for an electrode assembly of a rechargeable battery for minimizing a load of a winder in a spool moving device.

An embodiment provides a winder for an electrode assembly of a rechargeable battery including a plurality of spools for supplying a negative electrode member, a positive electrode member, a first separator member, and a second separator member, a mandrel for stacking and spirally winding the first separator member, the negative electrode member, the second separator member, and the positive electrode member respectively supplied by the spool, a first frame accommodating a predetermined number of spools from among the plurality of spools and the mandrel, a second frame connected to cross an end of the first frame and accommodating other spools from among the plurality of spools, a reorienter installed between the first frame and the second frame and reorienting a convey direction of the member, and a position controller for controlling a position of the member that passes through the reorienter and is conveyed towards the mandrel.

The first frame and the second frame are connected to cross each other.

The reorienter is formed with an air turn bar installed at ends of the first frame and the second frame.

The position controller is formed with a pivot device installed in the first frame and disposed at a front of the mandrel in the convey direction of the member.

The plurality of spools include a first separator member spool for supplying the first separator member, a negative electrode member spool for supplying the negative electrode member, a second separator member spool for supplying the second separator member, and a positive electrode member spool for supplying the positive electrode member The first separator member spool is installed in the first frame.

The negative electrode member spool, the second separator member spool, and the positive electrode member spool are installed in the second frame.

The reorienter includes a first air turn bar for reorienting the negative electrode member; a second air turn bar for reorienting the positive electrode member; and a third air turn bar for reorienting the second separator member.

The position controller includes a first pivot device disposed between the first air turn bar and the mandrel and controlling a position of the conveyed negative electrode member, a second pivot device disposed between the second air turn bar and the mandrel and controlling a position of the conveyed positive electrode member, and a third pivot device disposed between the third air turn bar and the mandrel and controlling a position of the conveyed second separator member.

Another embodiment provides a winder for an electrode assembly of a rechargeable battery including a plurality of spools for supplying a negative electrode member, a positive electrode member, and a separator member, a mandrel for stacking and spirally winding members supplied by the spools, and a frame for installing the spool and the mandrel. Some of the spools from among the plurality of spools and the mandrel are installed in front of the frame, and other spools are installed on one side of the frame.

The one side of the frame may be one of a top side, a left side, and a right side of the frame.

The winder includes an air turn bar installed at edges of a front and a side of the frame and reorienting a convey direction of the member, and a pivot device for controlling a position of the member that passes through the air turn bar and is conveyed towards the mandrel.

According to the exemplary embodiments, efficiency of space use of the winder is increased and the required space for the winder is reduced by installing some spools in front of the frame (e.g., the first frame) and installing other spools on a side of the frame (e.g., the second frame).

The air turn bar is applied so as to reorient the member, and a less-weighting pivot device is applied so as to control the position of the member thereby minimizing the load of the winder compared to the conventional spool moving device for controlling the position of the member.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

A winder is used to manufacture an electrode assembly of a rechargeable battery. The winder includes a negative electrode member spool for supplying a negative electrode member, a positive electrode member spool for providing a positive electrode member, two separator spools for supplying two separator members, and a mandrel for spirally winding the members supplied by the spools.

Generally, the negative electrode member, the positive electrode member, and the separator member supplied by the respective spools are conveyed towards the mandrel in front of the winder. When the members are conveyed during a winding process, the winder senses positions of the members by using a displacement sensor, and controls the positions of the spools in a perpendicular direction with respect to a member supplying direction to control the supplying positions of the respective members. For this purpose, the winder includes moving devices for controlling the positions of the spools in the perpendicular direction with respect to the member supplying direction.

Since the winder includes relatively large spools in front of the winder, the winder adversely requires large space. Further, because of heavy weight of the mobile devices, the winder is heavily loaded in order to control the spools.

Embodiments that will be discussed in the following provide a winder requiring a relatively small space and having a relatively light weight.

Figure 1:
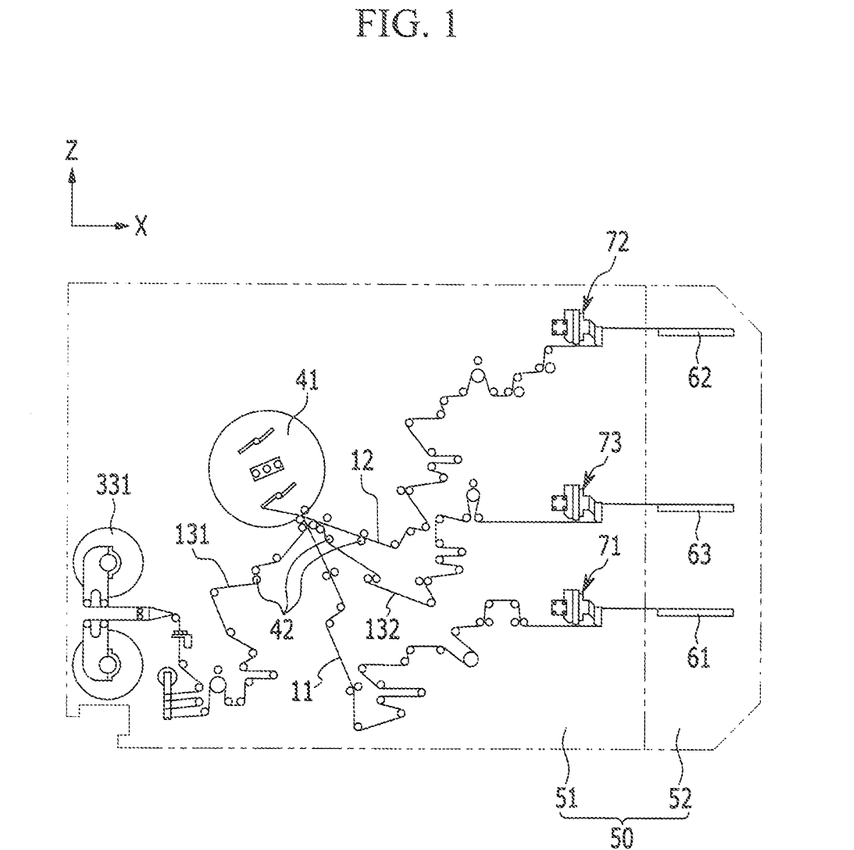
FIG. 1 is a front view of a winder for an electrode assembly of a rechargeable battery, constructed as an embodiment according to the principles of the present invention.
Figure 2:
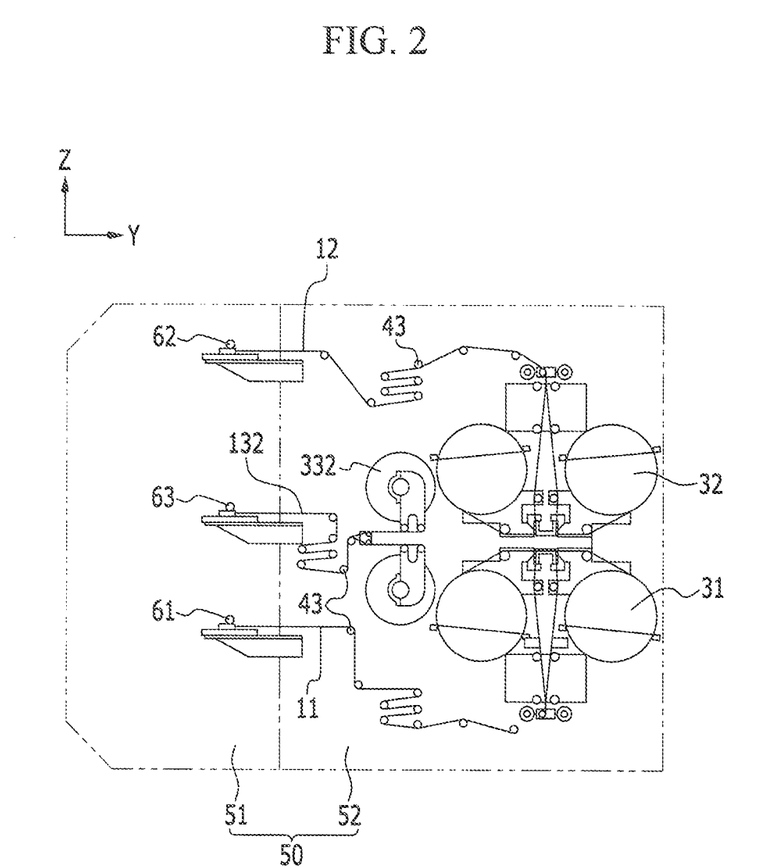
FIG. 2 is a right side view of a winder for an electrode assembly of a rechargeable battery, constructed as an embodiment according to the principles of the present invention.
Figure 3:
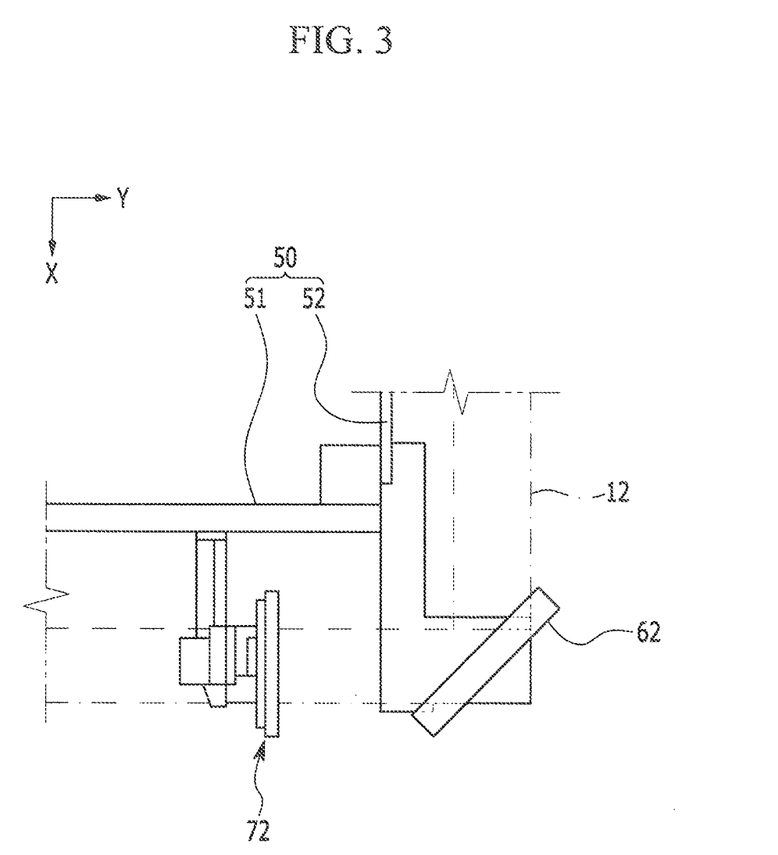
FIG. 3 is a partial top plan view of a winder for an electrode assembly of a rechargeable battery, constructed as an embodiment according to the principles of the present invention.
Figure 6:
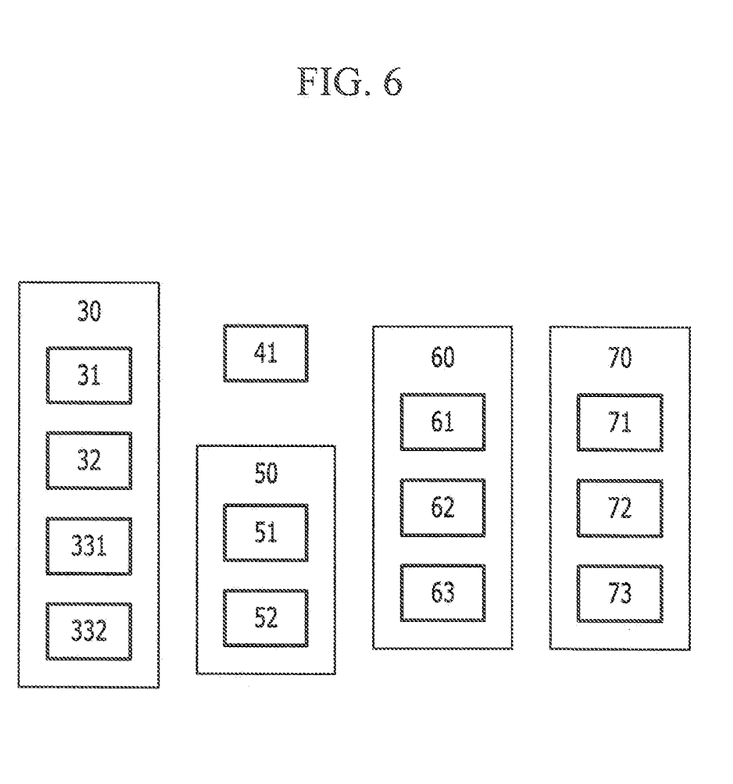
FIG. 6 is a diagram schematically illustrating major components of a winder for an electrode assembly of a rechargeable battery.

FIG. 1 shows a front view of a winder for an electrode assembly of a rechargeable battery, constructed as an embodiment according to the principles of the present invention. FIG. 2 shows a right side view of a winder for an electrode assembly of a rechargeable battery, constructed as an embodiment according to the principles of the present invention. FIG. 3 shows a partial top plan view of a winder for an electrode assembly of a rechargeable battery, constructed as an embodiment according to the principles of the present invention. Illustrated by a respective coordinate system in each of FIGS. 1 through 3, the front view is a view towards an XZ plane of an XYZ coordinate system, the right side view is a view towards an YZ plane of the XYZ coordinate system, and the top plan view is a view towards XY plane of the XYZ coordinate system. FIG. 6 is a diagram schematically illustrating major components of a winder for an electrode assembly of a rechargeable battery.

Referring to FIG. 1 through FIG. 3 and FIG. 6, the winder for an electrode assembly of a rechargeable battery spirally winds a negative electrode member 11, a positive electrode member 12, a first separator member 131, and a second separator member 132 into a jellyroll shape.

Although not shown, the rechargeable battery is formed by installing the electrode assembly and electrolyte solution for a charge and discharge operation in a case, and installing a cap assembly that is electrically connected to the electrode assembly in an opening of the case.

The electrode assembly is formed by spirally winding a first separator, a negative electrode, a second separator, and a positive electrode that are sequentially stacked into a jellyroll shape. More specifically, as shown in FIGS. 1 and 2, the winder spirally winds the first separator member 131, the negative electrode member 11, the second separator member 132, and the positive electrode member 12 that are sequentially stacked into a jellyroll shape.

The first separator member 131, the negative electrode member 11, the second separator member 132, and the positive electrode member 12 are spirally wound to respectively form the first separator, the negative electrode, the second separator, and the positive electrode of the electrode assembly.

The winder includes a plurality of spools 30 for supplying respective members, a mandrel 41 for stacking and spirally winding the members supplied by the spools 30, a frame 50 for accommodating the spools 30 and the mandrel 41, a reorienter 60 for changing a convey direction of a member, and a position controller 70 for controlling a position of the member.

In detail, the spools 30 include a negative electrode member spool 31 for supplying the negative electrode member 11, a positive electrode member spool 32 for supplying the positive electrode member 12, a first separator member spool 331 for supplying the first separator member 131, and a second separator member spool 332 for supplying the second separator member 132.

The mandrel 41 stacks and spirally winds the first separator member 131, the negative electrode member 11, the second separator member 132, and the positive electrode member 12 supplied by the first separator member spool 331, the negative electrode member spool 31, the second separator member spool 332 and the positive electrode member spool 32, respectively.

The frame 50 shown in FIG. 3 includes a first frame 51 and a second frame 52. For example, the first frame 51 may provide one installation space and the second frame 52 may provide another installation space on a side of the first frame 51.

In this instance, the side of the frame 51 includes a top side, a left lateral side, and a right lateral side opposite to the left lateral side of the frame 51. For convenience, the second frame 52 is formed on the right lateral side of the first frame 51 as shown in FIGS. 1 through 3.

The first frame 51 is substantially formed in a perpendicular manner with respect to the second frame 50 so that the first separator member spool 331 and the mandrel 41 may be installed in a protrusive manner on the side of the first frame. Also, a plurality of idler rolls 42 for supporting, reorienting, and guiding the first separator member 131, the negative electrode member 11, the second separator member 132, and the positive electrode member 12 are installed in the first frame 51.

The first separator member spool 331 supplies the first separator member 131 to the mandrel 41. In this instance, the first separator member 131 is supported and guided by the plurality of idler rolls 42 installed in the first frame 51.

The first separator member 131 and the mandrel 41 are installed in the first frame 51 so the first separator member 131 does not need to be reoriented. Also, the first separator member 131 and the mandrel 41 have a relatively short distance therebetween so the first separator member 131 does not need a position controlling.

The second frame 52 is substantially formed in a perpendicular direction with respect to the first frame 51, and allows the negative electrode member spool 31, the second separator member spool 332, and the positive electrode member spool 32 to be installed in a protrusive manner on the side of the second frame 52. Further, a plurality of idler rolls 43 for supporting, reorienting, and guiding the supplied negative electrode member 11, the second separator member 132, and the positive electrode member 12 are installed at edges of the first and second frames 51 and 52 that are connected to each other.

That is, the first frame 51 provides an installation space in front of the frame 50, and the second frame 52 provides an installation space on the side of the frame 50. Therefore, the frame 50 efficiently acquires the installation space.

FIG. 3 shows a partial top plan view of a winder for an electrode assembly of a rechargeable battery, constructed as an embodiment according to the principles of the present invention. Referring to FIG. 3, the frame 50 can be formed by connecting the second frame 52 to cross an end of the first frame 51. For example, the first and second frames 51 and 52 can be connected with each other at a right angle.

The winder forms the frame 50 by connecting the first frame 51 and the second frame 52 with the right angle therebetween so a side space of the first frame 51 can be used. That is, the second frame 52 reduces the area of the first frame 51 and acquires an additional space on the side of the first frame 51 and the efficiency of space use of the frame 50 can be increased.

Figure 4:
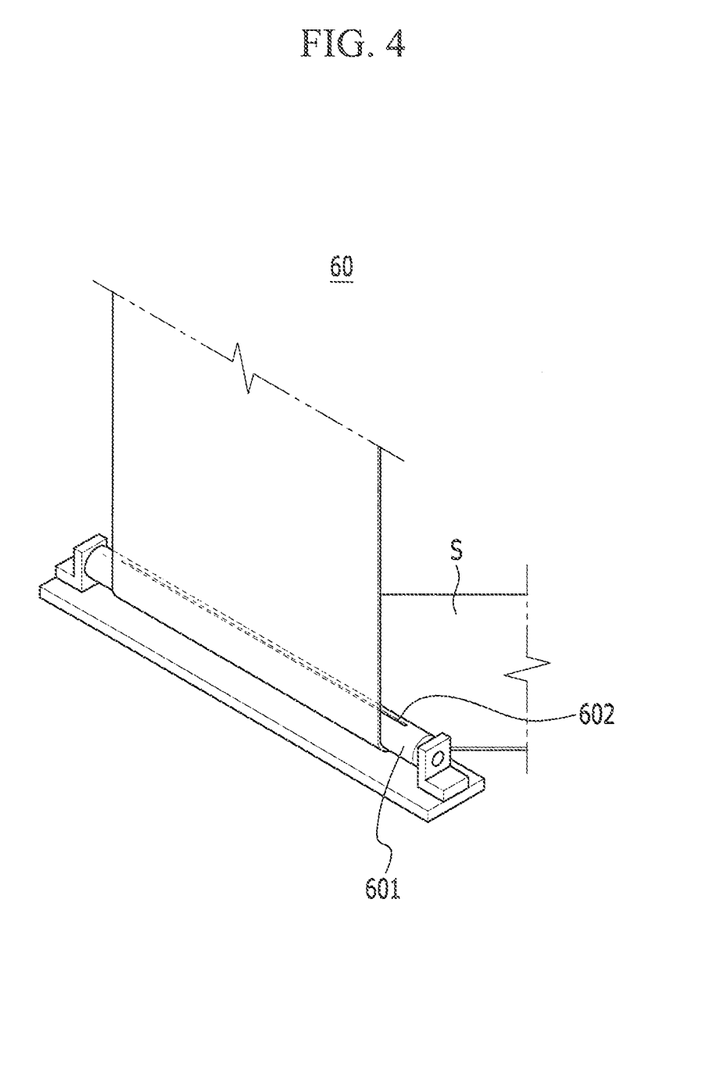
FIG. 4 is an oblique view of a reorienter for changing a progress direction of a member.

FIG. 4 shows an oblique view of a reorienter for changing a convey direction of a member. Referring to FIG. 4, the reorienter 60 supplies a member S, which may be the negative electrode member 11, the positive electrode member 12, or the second separator member 132, provided from the second frame 52 connected to the first frame 51 in a crossing manner to the first frame 51.

For example, the reorienter 60 may include an air turn bar 601 that is installed at connection edges of the first and second frames 51 and 52 and reorients the member S. The air turn bar 601 sprays air through an air hole 602 formed in the air turn bar 601 to reorient the conveyed member S and to minimize friction between the member S and the air turn bar 601. Therefore, damage to the member S may be prevented.

In detail, the reorienter 60 includes a first air turn bar 61 for reorienting the negative electrode member 11, a second air turn bar 62 for reorienting the positive electrode member 12, and a third air turn bar 63 for reorienting the second separator member 132.

The first air turn bar 61 reorients the negative electrode member 11 supplied by the negative electrode member spool 31 on the side of the second frame 52 and supported by the idler roll 43 to the side of the first frame 51 from the side of the second frame 52.

The second air turn bar 62 reorients the positive electrode member 12 supplied by the positive electrode member spool 32 of the second frame 52 and supported by the idler roll 43 to the side of the first frame 51 from the side of the second frame 52.

The third air turn bar 63 reorients the second separator member 132 supplied by the second separator member spool 332 on the side of the second frame 52 and supported by the idler roll 43 to the side of the first frame 51 from the side of the second frame 52.

Figure 5:
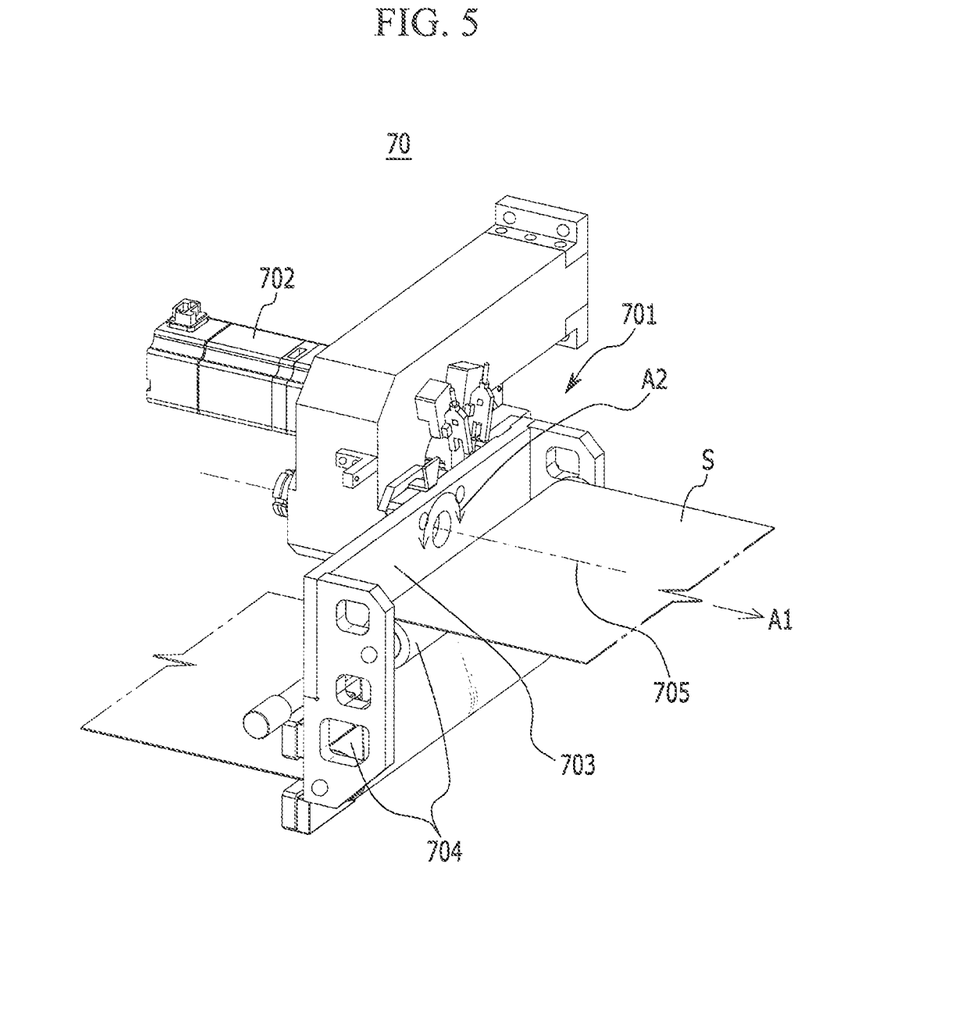
FIG. 5 is an oblique view of a position controller for controlling a progress position of a member.

FIG. 5 shows an oblique view of a position controller 70 for controlling a convey position of a member. Referring to FIG. 5, the position controller 70 controls a position of the member S that passes through the reorienter 60 and is conveyed towards the mandrel 41 in a direction A1.

For example, the position controller 70 may include a pivot device 701 for controlling the position of the member S. The pivot device 701 includes a bracket 703 that is rotated by a motor 702, and a pair of rolls 704 that are installed in the bracket 703 and hook the member S and allow the same to pass by.

Therefore, the pivot device 701 rotates the bracket 703 in a direction A2, clockwise or counterclockwise, with respect to an axis 705 driven by the motor 702. For example, although not shown, the motor 702 may rotate the bracket 703 in the direction A2, clockwise or counterclockwise, by driving a cam which controls a link connected between the cam and a side of the bracket 703. Accordingly, the pair of rolls 704 are rotated in the direction A2, clockwise or counterclockwise. The position of the conveyed member S is thus controlled in the direction A1. The position controlled member S is guided by the idler roll 42 and is conveyed to the mandrel 41.

In detail, the position controller 70 includes a first pivot device 71 for controlling a position of the negative electrode member 11, a second pivot device 72 for controlling a position of the positive electrode member 12, and a third pivot device 73 for controlling a position of the second separator member 132.

The first pivot device 71 is disposed between the first air turn bar 61 and the mandrel 41 in front of the first frame 51. The first pivot device 71 controls the position of the conveyed negative electrode member 11 and supply the negative electrode member 11 supported by the idler roll 42 to the mandrel 41.

The second pivot device 72 is disposed between the second air turn bar 62 and the mandrel 41 in front of the first frame 51. The second pivot device 72 controls the position of the positive electrode member 12 conveyed in the direction A to supply the positive electrode member 12 supported by the idler roll 42 to the mandrel 41.

The third pivot device 73 is disposed between the third air turn bar 63 and the mandrel 41 in front of the first frame 51. The third pivot device 73 controls the position of the second separator member 132 and supply the second separator member 132 supported by the idler roll 42 to the mandrel 41.

In order to reorient the convey direction A1 of the member S to the side of the first frame 51 from the side of the second frame 52, the air turn bar 601 is provided and the position of the member S is rotated in the direction A2 and controlled by the pivot device 701 to minimize a load of the winder.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A winder winding an electrode assembly of a rechargeable battery, comprising:
   a plurality of spools respectively supplying a negative electrode member, a positive electrode member, a first separator member, and a second separator member;
   a mandrel stacking and spirally winding the first separator member, the negative electrode member, the second separator member, and the positive electrode member respectively supplied by the plurality of spools;
   a first frame accommodating the mandrel and a predetermined number of spools from among the plurality of spools, the first frame having a lateral side;
   a second frame connected to an end of the first frame by protruding from the lateral side of the first frame, and accommodating other spools from among the plurality of spools;
   a reorienter installed at an end of first frame shared by the second frame to reorient a convey direction of at least one of the members; and
   a position controller controlling a position of said at least one of the members that passes through the reorienter and is conveyed towards the mandrel.

2. The winder of claim 1, wherein the reorienter includes an air turn bar.

3. The winder of claim 1, wherein the plurality of spools include:
   a first separator member spool supplying the first separator member;
   a negative electrode member spool supplying the negative electrode member;
   a second separator member spool supplying the second separator member; and
   a positive electrode member spool supplying the positive electrode member,
   the first separator member spool installed in the first frame.

4. The winder of claim 3, wherein the negative electrode member spool, the second separator member spool, and the positive electrode member spool are installed in the second frame.

5. The winder of claim 4, wherein the reorienter includes:
   a first air turn bar reorienting the negative electrode member;
   a second air turn bar reorienting the positive electrode member; and
   a third air turn bar reorienting the second separator member.

6. The winder of claim 5, wherein the position controller includes:
   a first pivot device disposed between the first air turn bar and the mandrel and controlling a position of the conveyed negative electrode member;
   a second pivot device disposed between the second air turn bar and the mandrel and controlling a position of the conveyed positive electrode member; and
   a third pivot device disposed between the third air turn bar and the mandrel and controlling a position of the conveyed second separator member.

7. A winder winding an electrode assembly of a rechargeable battery, comprising:
   a plurality of spools respectively supplying a negative electrode member, a positive electrode member, a first separator member, and a second separator member;
   a mandrel stacking and spirally winding the first separator member, the negative electrode member, the second separator member, and the positive electrode member respectively supplied by the plurality of spools;
   a first frame accommodating the mandrel and a predetermined number of spools from among the plurality of spools;
   a second frame connected to an end of the first frame and accommodating other spools from among the plurality of spools;
   a reorienter installed between the first frame and the second frame to reorient a convey direction of at least one of the members; and
   a position controller controlling a position of said at least one of the members that passes through the reorienter and is conveyed towards the mandrel, the position controller including a pivot device which is installed in the first frame and which is disposed in the convey direction of said at least one of the members between the mandrel and the respective spool which supplies said at least one of the members.

8. A winder winding an electrode assembly of a rechargeable battery, comprising:
   a plurality of spools respectively supplying a negative electrode member, a positive electrode member, and a separator member;
   a mandrel stacking and spirally winding members supplied by the spools; a frame accommodating the spools and the mandrel;
   an air turn bar installed at edges of a front and a side of the frame and reorienting a convey direction of at least one of the members; and
   a pivot device controlling a position of said at least one of the members that passes through the air turn bar and is conveyed towards the mandrel,
   some of the spools from among the plurality of spools and the mandrel being installed on a first side of frame, and other spools installed on a second side of the frame.

9. The winder of claim 8, wherein the second side of the frame is one of a top side, a left side, and a right side of the frame.

* * * * *